(12) United States Patent
Tanaka

(10) Patent No.: US 7,159,117 B2
(45) Date of Patent: Jan. 2, 2007

(54) ELECTRONIC WATERMARK DATA INSERTION APPARATUS AND ELECTRONIC WATERMARK DATA DETECTION APPARATUS

(75) Inventor: Nobuyuki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 657 days.

(21) Appl. No.: 09/815,849

(22) Filed: Mar. 23, 2001

(65) Prior Publication Data

US 2001/0026616 A1 Oct. 4, 2001

(30) Foreign Application Priority Data

Mar. 23, 2000 (JP) .............................. 2000/082211

(51) Int. Cl.
*H04L 9/00* (2006.01)
(52) U.S. Cl. ...................................... 713/176; 380/202
(58) Field of Classification Search ................. 380/202; 713/176
See application file for complete search history.

(56) References Cited

U.S. PATENT DOCUMENTS

| 5,530,759 | A |   | 6/1996 | Braudaway et al. |
| 6,154,571 | A | * | 11/2000 | Cox et al. .................... 382/250 |
| 6,208,745 | B1 | * | 3/2001 | Florencio et al. ........... 382/100 |
| 6,229,924 | B1 | * | 5/2001 | Rhoads et al. .............. 382/232 |
| 6,275,599 | B1 | * | 8/2001 | Adler et al. ................. 382/100 |
| 6,421,445 | B1 | * | 7/2002 | Jensen et al. ................ 380/253 |
| 6,532,541 | B1 | * | 3/2003 | Chang et al. ............... 713/176 |
| 6,560,339 | B1 | * | 5/2003 | Iwamura ..................... 380/201 |
| 6,674,873 | B1 | * | 1/2004 | Donescu et al. ............ 382/100 |

FOREIGN PATENT DOCUMENTS

| GB | 2335816 | 9/1999 |
| JP | 5-30466 | 2/1993 |
| JP | 6-315131 | 11/1994 |
| JP | 10-145757 | 5/1998 |
| JP | 10-191330 | 7/1998 |
| JP | 10-210435 | 8/1998 |
| JP | 10-513324 | 12/1998 |

(Continued)

OTHER PUBLICATIONS

Nikkei Electronics, No. 660, Apr. 22, 1996, p. 13.

(Continued)

*Primary Examiner*—Emmanuel L. Moise
*Assistant Examiner*—Michael Pyzocha
(74) *Attorney, Agent, or Firm*—Scully, Scott, Murphy & Presser, P.C.

(57) ABSTRACT

An electronic watermark data insertion apparatus comprises an insertion information memory (39) for preliminarily storing insertion information for designating electronic watermark data to be inserted block by block and an electronic watermark data insertion unit (33) for inserting, on the basis of the insertion information, the designated electronic watermark data from an electronic watermark data table (37) in a quantized image block by block. An electronic watermark data detection apparatus comprises an electronic watermark date extracting unit (45) for extracting the image data having a biased frequency region projecting in dependency on the inserted electronic watermark data block by block and an electronic watermark data detection unit (50) for calculating a statistical similarity between the extracted data and the electronic watermark data stored in an electronic watermark data table (48). An electronic watermark data accumulator (51) accumulates the statistical similarity for a predetermined time interval to produce an accumulated addition result which is reset after the elapse of the predetermined time interval or when the accumulated addition result exceeds the a predetermined threshold value. A determining unit (52) determines that the electronic watermark data is detected when the accumulated addition result exceeds the predetermined threshold value.

4 Claims, 8 Drawing Sheets

FOREIGN PATENT DOCUMENTS

| | | |
|---|---|---|
| JP | 11-55639 | 2/1999 |
| JP | 11-153956 | 6/1999 |
| JP | 11-341452 | 12/1999 |
| JP | 2001-525152 | 12/2001 |
| JP | 2002-516538 | 6/2002 |
| WO | WO 99/45706 | 9/1999 |
| WO | WO 99/60791 | 11/1999 |
| WO | WO 99/60792 | 11/1999 |

OTHER PUBLICATIONS

Tae-Yun Chung, et. al., "Digital Watermarking for Copyright Protection of MPEG2 Compressed Video", *IEEE Transactions on Consumer Electronics*, IEEE, vol. 44, No. 3, pp. 895-901, (Aug. 1998).

A. Z. Tirkel, et al., "Secure Arrays for Digital Watermarking", Pattern Recognition, 1998. Proceedings. *Fourteenth International Conference on Brisbane*, QLD., Australia Aug. 16-20, 1998, Los Alamitos, CA, USA, IEEE Comput. Soc, US, pp. 1643-1645, (Aug. 1998).

Jack Lacy, et. al., "On Combining Watermarking with Perceptual Coding", Acoustics, Speech and Signal Processing, 1998. Proceedings of the *1998 IEEE International Conference on Seattle*, WA, USA May 12-15, 1998, New York, NY, USA, IEEE, US, pp. 3725-3728, (May 1998).

Mohan S. Kankanhalli, et. al., "Content Based Watermarking of Images", Proceedings of the *ACM Multimedia '98, Bristol, UK*, Sep. 12-16, 1998, ACM International Multimedia Conference, New York, NY: ACM, US, Conf. 6, pp. 61-70, (Sep. 1998).

Choong-Hoon Lee, et. al., "Adaptive Digital Image Watermarking Using Variable Size of Blocks in Frequency Domain", Tencon 99. Proceedings of the *IEEE Region 10 Conference Cheju Island, South Korea*, Sep. 15-17, 1999, Piscataway, NJ, USA, IEEE, US, pp. 702-705, (Sep. 1999).

Frank Hartung, et. al., "Multimedia Watermarking Techniques", *Proceedings of the IEEE*, IEEE. New York, US, vol. 87, No. 7, pp. 1079-1107, (Jul. 1999).

Hea Joung Kim, "Protecting Ownership Rights of a Lossless Image Coder Through Hierarchical Watermarking", IEEE (1998), pp. 73-82.

\* cited by examiner

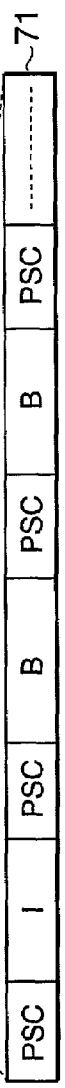
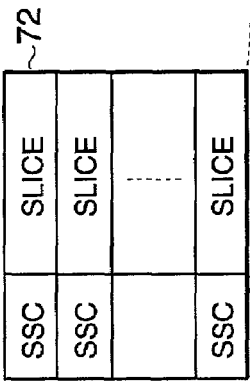
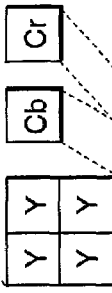
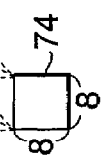
FIG. 8A SEQUENCE LAYER
FIG. 8B GOP LAYER
FIG. 8C PICTURE LAYER
FIG. 8D SLICE LAYER
FIG. 8E MACRO BLOCK LAYER
FIG. 8F BLOCK LAYER

ELECTRONIC WATERMARK DATA INSERTION APPARATUS AND ELECTRONIC WATERMARK DATA DETECTION APPARATUS

BACKGROUND OF THE INVENTION

This invention relates to an electronic watermark data insertion apparatus and an electronic watermark data detection apparatus and, in particular, to an electronic watermark data insertion apparatus for embedding identifiable additional information in digital data such as a picture or the like and an electronic watermark data detection apparatus for detecting the identifiable additional information from the digital data.

With the recent improvements of information processing techniques or communication techniques in these years, various kinds of information in the shape of pictures or voices of multimedia information for use in the Internet, a digital video disk or digital versatile disc (DVD), or a digital broadcasting, can be obtained as digital data. As the digital data can be copied or edited without degrading data, a problem occurs such that copies of digitized picture data can easily be made though the copying of the data is illegal.

As one of techniques for preventing such illegal copying, a digital data cryptographic technique is known. According to the digital data cryptographic technique, enciphered digital picture data may be reproduced only by a reproduction system which is provided with a proper cipher recovering key. However, it is disadvantageously impossible to prevent illegal copying which will be carried out once after a cipher is deciphered.

As another technique for preventing the illegal copying of the digital data, a known technique aims to prevent unlawful use and copies of the digital picture data by embedding particular information such as electronic watermark data in the digital picture data.

The electronic watermark data inserted in the picture data such as digital data are classified into two types, that is, visible electronic watermark data and invisible electronic watermark data.

The visible electronic watermark data are represented by special characters, marks, symbols, or other data inserted in pictures so that a composite picture in which the electronic watermark data are composed can be visibly recognized or seen by an observer. Accordingly, although the composite picture results in degradation of picture quality, there is an advantageous effect to visibly appeal, to the users of the composite picture, prevention of unauthorized appropriations such as illegal copying.

The known technique for embedding the visible electronic watermark data in the digital data is disclosed, for example, in U.S. Pat. No. 5,530,759 issued to Gordon W. Braudaway et al. under the title of "COLOR CORRECT DIGITAL WATERMARKING OF IMAGES." According to Braudaway et al., in order to prevent chromaticities of an original image from altering at points where an electronic watermark image appears, an electronic watermark data insertion apparatus examines, on combining the electronic watermark image with the original image, pixels of the electronic watermark image, and modifying, for each pixel whose value is not a specified "transparent" value, the corresponding pixel of the original image by changing its brightness but its chromaticities. A scaling value for changing the brightness of the pixel is determined, for example, based on the values of the color components, a random sequence, or the value of a corresponding watermark pixel.

Compared with such visible electronic watermark data, the invisible electronic watermark data is, for example, a peculiar data such as information identifying an author. Compared with the visible electronic watermark data, the invisible electronic watermark data is in common to a point where it is inserted in the original image, but differs in a point where it is inserted in the original image with no degradation of picture quality of the original image. That is, the invisible electronic watermark data inserted in the original data cannot be visibly recognized or seen with respect to a composite image.

Accordingly, by embedding the peculiar data which is able to identify the author as the electronic watermark data into the original image, it is possible to identify the author of the original image by detecting the inserted electronic watermark data even after the illegal copying is carried out. In addition, by embedding information indicative of impermission of copying (copying impermission information) into the original image, it is possible to detect the copying impossible information in a reproduction apparatus and to inform a user of the original image of which copying is not permitted is being copied. Furthermore, by embedding information indicative of a prohibition of copying (copy prohibition information) in the original image, it is possible to restrict copying of the original image to a video tape recorder (VTR) or the like by operating a copying prevention mechanism.

Various techniques for embedding the invisible electronic watermark data in a digital data such as a digital image are already known. For example, a first prior art discloses a technique in which the invisible electronic watermark data is embedded into a least significant bit (LSB) of a pixel data of the digital data that has little adverse effect on image quality of the original image for producing a composite image which is obtained by inserting the invisible electronic watermark data in the original image. However, the first prior art is disadvantageous in that only the watermark data may be easily removed from the composite image with no degradation of the image quality of the original image. For instance, it is possible to remove information corresponding to the LSB of the pixel data by using a low pass filter.

In the manner known in the art, an image compressive processing is, for example, carried out according to a JPEG (Joint Photographic Experts Group) and an MPEG (Moving Picture Experts Group) which are international standard coding systems for compressive coding color static image data and color dynamic image data, respectively. Such image compressive processing reduces an amount of the image data by removing an information amount of a part having little adverse effect on such as image quality from an original image. However, if the image compressive processing is carried out for an image data where the electronic watermark data is embedded in the LSB thereof, the electronic watermark data embedded in this portion will be lost. Accordingly, the first prior art is disadvantageous in that it may be difficult to redetect the electronic watermark data.

On the other hand, a second prior art is disclosed, for example, in Japanese Unexamined Patent Publication (JP-A) Tokkai No. Hei 6-315,131 or JP-A 6-315131 under the title of invention of "INFORMATION EMBEDDING DEVICE AND REPRODUCTION DEVICE." JP-A 6-315131 discloses a technical idea for detecting, by using image correlation between successive frames in an original image data, a particular area where an image is not degraded if the particular area is replaced by a peripheral area thereof on reproduction, and for easily detecting the particular area at a reproduction side by inserting the invisible electronic watermark data in the particular area. The second prior art will later be described in conjunction with FIG. 1 in more detail.

However, as the electronic watermark data is not embedded in all of frames in the second prior art, it is impossible for the technique in the second prior art to prevent illegal copying on frames in which the electronic watermark data is not embedded. In addition, as the second prior art premises that the successive frames are static images or there are no change in the successive frames, it is impossible to identify the particular area in which the electronic watermark data should be embedded in a case where correlation becomes low between successive frames of a dynamic image having furious motion. Accordingly, the second prior art is disadvantageous in that in some cases the electronic watermark data may not be embedded in the original image.

A third prior art, which is another technique regarding embedding of the invisible electronic watermark data, is disclosed, for example, in Japanese Unexamined Patent Publication (JP-A) Tokkai No. Hei 5-30,466 or JP-A 5-30466 under the title of invention of "VIDEO SIGNAL RECORDER AND SIGNAL RECORDING MEIDUM." JP-A 5-30466 discloses a technical idea for frequency converting, in an electronic watermark data insertion apparatus, an original video signal into a frequency-converted video signal and for embedding, in the frequency-converted video signal, identification information acting as the electronic watermark data having a frequency less than a frequency band of the frequency-converted video signal. In JP-A 5-30466, an electronic watermark data detection apparatus picks up the original video signal by using a wide-band pass filter and picks up the identification information by using a low pass filter.

In the third prior art, the inserted electronic watermark data is not lost although an image compressive processing is carried out and it is possible to insert the electronic watermark data in any frame. However, the third prior art is disadvantageous in that the electronic watermark data can easily be removed from the original video signal by using the wide-band pass filter because the electronic watermark data is inserted in a portion which is lower than a frequency band of the frequency-converted video signal.

In addition, a proposal is made in a fourth prior art for frequency converting an original image data into a frequency-converted image data and for embedding an electronic watermark data in a large area of frequency components of the frequency-converted image data. The fourth prior art is disclosed, for example, in a journal of Nikkei Electronics, No. 660 (1996.4.22), page 13. An electronic watermark data insertion apparatus to which the fourth prior art is applied embeds the electronic watermark data in a frequency component of the original image data. Therefore, in an image processing such as an image compressive processing, filtering, or the like, it is possible to prevent the electronic watermark data inserted in a part having little adverse effect on image quality from being lost. Furthermore, by using a random number according to normal distribution as the electronic watermark data, it is possible to prevent interference between electronic watermark data in a case, for example, of embedding a plurality of electronic watermark data in the original image data. As a result, it is difficult in the fourth prior art to carry out an unlawful action such as to destroy only the electronic watermark data without significantly affecting all of the image data.

That is, the electronic watermark data insertion apparatus according to the fourth prior art converts an original image into frequency components by using a DCT (Discrete Cosine Transform) which is one of orthogonal transforms, for embedding an electronic watermark data calculated as a random number according to normal distribution in the frequency components to produce embedded frequency components, and carrying out an IDCT (Inverse DCT) on the embedded frequency components to obtain a composite image. More specifically, the electronic watermark data insertion apparatus selects first through n-th data f(1), f(2), . . . , and f(n) which have higher values in a frequency area obtained by converting an original image data by using DCT. In addition, the electronic watermark data insertion apparatus selects first through n-th electronic watermark data from the normal distribution having an average of zero and a variance of one and calculates Equation (1) regarding each variable i (where i=1, 2, . . . , n) as follows:

$$F(i)=f(i)+\alpha|f(i)|\times w(i) \quad (1)$$

where $\alpha$ represent a scaling factor. Finally, the electronic watermark data insertion apparatus replaces f(i) with F(i) as the frequency components obtained for each variable i, uses F(i) as frequency components of the composite image in which the electronic watermark data are inserted, and obtains the composite image by using the IDCT.

In order to detect the electronic watermark data inserted in the original image data in the manner which is described above, an electronic watermark data detection apparatus detects the original image data and known electronic watermark data candidates w(i) as follows. That is, the electronic watermark data detection apparatus converts, by using the DCT, the composite image in which the electronic watermark data are inserted into frequency components which have element values F(1), F(2), . . . , and F(n) embedding the electronic watermark data in a frequency region that correspond to f(1), f(2), and f(n). Subsequently, the electronic watermark data detection apparatus extracts electronic watermark data W(i) from f(i) and F(i) according to Equation (2) as follows:

$$W(i)=(F(i)-f(i))/f(i) \quad (2)$$

Subsequently, the electronic watermark data detection apparatus calculates, using an inner product of a vector, a statistical similarity C between a known electronic watermark data candidate vector $\vec{w}$ and an extracted electronic watermark data vector $\vec{W}$ according to Equations (3), (4), and (5) as follows:

$$\vec{W}=(W(1), W(2), \ldots, W(n)) \quad (3)$$

$$\vec{w}=(w(1), w(2), \ldots, w(n)) \quad (4)$$

$$C=\vec{W}\times\vec{w}/(WD\times wD) \quad (5)$$

where WD represents an absolute value of the extracted electronic watermark data vector $\vec{W}$ and wD represents an absolute value of the known electronic watermark data candidate vector $\vec{w}$. As a result, when the statistical similarity C calculated by Equation (5) is not less than a particular value, the electronic watermark data detection apparatus determines that the above-mentioned electronic watermark data candidates are embedded in the composite image data.

In the fourth prior art, if an author or the like owning an original image data prepares or generates a composite image data obtained by embedding electronic watermark data in the original image data, the author or the like can effectively carry out judgement of illegality thereof by detecting the electronic watermark data from a digital image data which may be illegally copied in the manner which is described above.

On the other hand, in the fourth prior art, the original image data and the electronic watermark data candidates w(i) are required to detect the electronic watermark data. Accordingly, the fourth prior art can be advantageously used in a case where the author owning an original image carries out judgement of the illegality by performing detection processing for the electronic watermark data on the image data which might have been copied illegally. However, general users cannot carry out the above-mentioned detection processing for the electronic watermark data because the general users have no original image data.

A fifth prior art includes the technique disclosed in the fourth prior art and the improvements therefor, and relates to an electronic watermark data insertion and detection apparatus in an MPEG system that is capable of detecting electronic watermark data which are already embedded in an original image by general users as well as an author.

The electronic watermark data insertion and detection apparatus in the MPEG system according to the fifth prior art divides the original image into a block consisting of (8×8) pixels (which may later be called a (8×8) pixel block) and carries out embedding and detecting of the electronic watermark data every block which is treated as a unit. An electronic watermark data insertion apparatus carries out, in an MPEG coding processing, a DCT processing on the original image to produce first through n-th frequency components f(1), f(2), . . . , and f(n) of an AC component in a frequency region in the order in they become high, and selects first through n-th electronic watermark data w(1), w(2), . . . , and w(n) from normal distribution having an average of zero and variance of one, where n represents a positive integer which is not less than two. Subsequently, the electronic watermark data insertion apparatus calculates an i-th converted frequency component F(i) according to Equation (6) for each variable i (where i=1, 2, . . . , n) as follows:

$$F(i)=f(i)+\alpha \times avg(f(i)) \times w(i) \quad (6)$$

where avg(f(i)) represents a partial average of three points close to an i-th frequency component f(i), for example, a partial average obtained by averaging absolute values of f(i−1), f(i), and f(i+1). Thereafter, the electronic watermark data insertion apparatus replaces the i-th frequency components f(i) by the i-th converted frequency component F(i) and carries out a succeeding processing of the MPEG coding processing on the first through the n-th converted frequency components F(1) to F(n) so as to obtain a composite image data in which the first through the n-th electronic watermark data w(1), w(2), . . . , and w(n) are embedded in the original image data.

In order to detect the electronic watermark data embedded in the composite image data, an electronic watermark data detection apparatus detects electronic watermark data candidates w(i) as known data as follows. The original image data is not required for detection. The electronic watermark data detection apparatus carries out, in an MPEG expansive processing, carries out inverse quantization on the composite image data to produce a frequency region of a block having first through n-th frequency components F(1), F(2), . . . , and F(n) in the order from the lowest one to the highest one. Subsequently, the electronic watermark data detection apparatus calculates, as an i-th partial average avg(F(i)), an average value of absolute values in three points close to an i-th frequency component F(i) and calculates an i-th electronic watermark data W(i) according to Equation (7) as follows:

$$W(i)=F(i)/avg(F(i)) \quad (7)$$

Furthermore, the electronic watermark data detection apparatus calculates an i-th total sum WF(i) of the i-th electronic watermark data W(i) of one image for every variable i. Subsequently, the electronic watermark data detection apparatus calculates, using an inner product of a vector, a statistical similarity C between an electronic watermark data candidate vector $\vec{w}$ and a total sum vector $\vec{WF}$ according to Equations (8) through (10) as follows:

$$\vec{WF}=(WF(1), WF(2), \ldots, WF(n)) \quad (8)$$

$$\vec{w}=(w(1), w(2), \ldots, w(n)) \quad (9)$$

$$C=\vec{WF} \times \vec{w}/(WFD \times wD) \quad (10)$$

where WFD represents an absolute value of the total sum vector $\vec{WF}$ and wD represent an absolute value of the electronic watermark data candidate vector $\vec{w}$. When the statistical similarity C is not less than a particular value, the electronic watermark data detection apparatus determines that the electronic watermark data are embedded in the composite image data.

The electronic watermark data being inserted by the technique as disclosed in the fourth and the fifth prior arts are not removed by a simple filtering processing in the electronic watermark data inserted by the technique disclosed in the third prior art. However, when electronic watermark data are inserted after the DCT processing in the MPEG coding processing, the electronic watermark data according to the fourth and the fifth prior arts may be lost because values of frequency components between a predetermined range are converted into particular quantized values by a quantization processing. Accordingly, in the fourth and the fifth prior arts, a large error occurs between the partial average on insertion and the partial average on detection and it results in lowering a detection precision of the electronic watermark data.

A sixth prior art is disclosed, for example, in Japanese Unexamined Patent Publication (JP-A) Tokkai No. Hei 10-191,330 or JP-A 10-191330 under the title of invention of "SYSTEM FOR INSERTING IDENTIFICATION DATA TO DIGITAL DATA AND DETECTION SYSTEM." JP-A 10-191330 discloses a technical idea for embedding electronic watermark data after quantizing of an MPEG coding processing and for detecting the electronic watermark data before inverse quantizing of an MPEG expansive processing. With this structure, inasmuch as it is possible to avoid disappearing the electronic watermark data caused by quantization, it is possible to prevent detection precision of the electronic watermark data from lowering caused by an error between partial averages on insertion and on detection.

A seventh prior art, which is still another technique regarding embedding of the invisible electronic watermark data, is disclosed, for example, in Japanese Unexamined Patent Publication (JP-A) Tokkai No. Hei 11-55,639 or JP-A 11-55639 under the title of invention of "ENCODE SYSTEM FOR DIGITAL DATA, ELECTONIC WATERMARK INSERTION METHOD AND STORAGE MEDIUM STORING CONTROL PROGRAM." JP-A 11-55639 discloses a technical idea for inserting an electronic watermark data into a digital image data comprising a series of field data such as an odd number field and an even number field in NTSC (National Television System Committee) or a Y component (a luminance component), a U component (a first chrominance component), and a V component (a second chrominance component), each electronic watermark data being inserted into the corresponding fields. Accordingly, it is possible to insert a plurality of electronic watermark data in one original image data by a very simple structure.

Now, attention will be directed to a human's visual characteristic where a dynamic image or a moving picture has a higher sensible resolution than a static image or a still picture. It is necessary to weaken electronic watermark data to be embedded in order not to degrade image quality of a composite image in which the electronic watermark data are embedded. In the above-mentioned second through seventh prior arts, signals embedded as invisible electronic watermark data are drastically attenuated by the above-mentioned filtering processing or the above-mentioned image compressive processing. On the other hand, if the embedded signals have large strength, an image quality of a composite image is degraded. In fact the strength of the embedded signals have to be taken into account. This is because the strength of the embedded signals as the electronic watermark data are dependent on a method of image compressive processing or the like. However, in a case where signal strength of the electronic watermark data is not taken into account as the second through the seventh prior arts, it may be impossible to detect the electronic watermark data embedded in the composite image data at a reproducing side. As a result, the second through the seventh prior arts are disadvantageous in that detection precision of the electronic watermark data is considerably deteriorated.

Accordingly, an eighth prior art is disclosed, for example, in Japanese Unexamined Patent Publication (JP-A) Tokkai No. Hei 11-341,452 or JP-A 11-341452 under the title of invention of "DYNAMIC IMAGE ELECTRONIC WATERMARK SYSTEM." JP-A 11-341452 discloses a technical idea for achieving detection precision at a reproducing side similar by weakly embedding the electronic watermark data in each frame at a range where image quality is not degraded, accumulating the electronic watermark data up to sufficient strength at the reproducing side, and by carrying out judgement for the embedded data.

As described above, in a case where the invisible watermark data are embedded in the original data, the problem is that the invisible watermark data may be removed by a simple filtering processing, an electronic watermark data cannot be inserted in any frame, the electronic watermark data are lost by a quantization processing, and so on.

In addition, as the fourth through the sixth prior arts neither disclose nor teach techniques for embedding a plurality of electronic watermark data in one frame of the composite image, the fourth through the sixth prior arts are disadvantageous in that degradation in the image quality of the composite image occurs in a case where the electronic watermark data are inserted in one frame in common.

Furthermore, although the seventh prior art can embed a plurality of electronic watermark data in a simple structure, the seventh prior art is disadvantageous in that the image quality of the composite image is degraded and detection precision of the embedded electronic watermark data is deteriorated in a case where the strength of the embedded electronic watermark data is not taken into consideration in dependency on a specific characteristic peculiar to the dynamic image.

In contract with those, the eighth prior art includes improvements such that the detection precision by weakly embedding the electronic watermark data in each frame at a range where image quality is not degraded and by accumulating and determining the electronic watermark data up to sufficient strength at the reproducing side.

However, inasmuch as the eighth prior art accumulates and determines signals of the weakly embedded electronic watermark data by using a variable threshold value corresponding to the number of accumulated frames at the reproducing side, the eighth prior art is disadvantageous in that it is impossible to ensure a time interval for which the signals of the embedded electronic watermark data cannot be detected without exceeding the threshold value. More specifically, that the signals of the electronic watermark data are not detected at the reproducing side means that it results in necessity of a very long detection time interval or that it is impossible to quite detect the signals of the embedded electronic watermark data. Accordingly, it may be difficult to analyze a cause where the electronic watermark data are not detected. As a result, it is desirable to suit the detection precision so as to be clear a time interval required for detecting the next inserted electronic watermark data and to embed the electronic watermark data having strength enable to detect at the next time although once does not detect the electronic watermark data. Furthermore, inasmuch as the eighth prior art sets the signal strength of the embedded electronic watermark data in consideration of the detection precision, it is desirable to enable to obtain high fine image quality as far as possible with simple in structure in a case of inserting the electronic watermark data.

SUMMARY OF THE INVENTION

It is therefore an object of the present invention to provide an electronic watermark data insertion apparatus which is capable of inserting electronic watermark data with ensuring no detection time interval.

It is another object of the present invention to provide an electronic watermark data insertion apparatus of the type described, which is capable of inserting electronic watermark data without degradation of image quality as far as possible with simple in structure.

It is still another object of the present invention to provide an electronic watermark data detection apparatus which is capable of detecting electronic watermark data with ensuring no detection time interval.

It is yet another object of the present invention to provide an electronic watermark data detection apparatus of the type described, which is capable of detecting electronic watermark data without degradation of image quality as far as possible with simple in structure.

Other objects of this invention will become clear as the description proceeds.

According to an aspect of this invention, there is provided an electronic watermark data insertion apparatus comprising frequency region converting arrangement, supplied with an original image of one frame divided into a plurality of blocks each consisting of a plurality of pixels, for converting the original image into a frequency-converted image data of a frequency region block by block. An electronic watermark data memorizing arrangement preliminarily memorizes a plurality of electronic watermark data. An insertion information memorizing arrangement memorizes insertion information for designating the electronic watermark data to be inserted corresponding to the respective blocks among the electronic watermark data stored in the electronic watermark data memorizing arrangement. An electronic watermark data selecting arrangement selects the particular electronic watermark data designated by the insertion information block by block from the electronic watermark memorizing arrangement to produce a selected electronic watermark data. An electronic watermark data inserting arrangement inserts the selected electronic watermark data in the frequency-converted image data of the frequency region to produce an electronic watermark inserted composite image data.

According to another aspect of this invention, there is provided an electronic watermark detection apparatus comprising an insertion information memorizing arrangement for preliminarily memorizing insertion information for designating a type of electronic watermark data to be inserted block by block in one frame divided into a plurality of blocks. Supplied with an electronic watermark inserted composite image divided into a plurality of blocks in which individual electronic watermark data are inserted block by block, a data extracting arrangement extracts, on the basis of the insertion information, the electronic watermark data by adding the blocks in which the same electronic watermark data are inserted to produce extracted data. An electronic watermark data memorizing arrangement preliminarily memorizes a plurality of electronic watermark date inserted in the respective blocks. An electronic water data detecting arrangement calculates a statistical similarity between the extracted data and the respective electronic watermark data stored in the electronic watermark data memorizing arrangement. A determining arrangement determines, on the basis of the statistical similarity, whether or not the electronic watermark data is detected.

BRIEF DESCRIPTION OF THE DRAWINGS

FIG. 3 is a view showing an outline of insertion information set in an electronic watermark data insertion unit for use in the electronic watermark data insertion apparatus illustrated in FIG. 2;

FIG. 4 shows an example of a first electronic watermark data registered in an electronic watermark data table for use in the electronic watermark data insertion apparatus illustrated in FIG. 2;

FIGS. 8A through 8F collectively show structure of an image data according to an encoding system of an MPEG standard;

DESCRIPTION OF THE PREFERRED EMBODIMENTS

Figure 1:
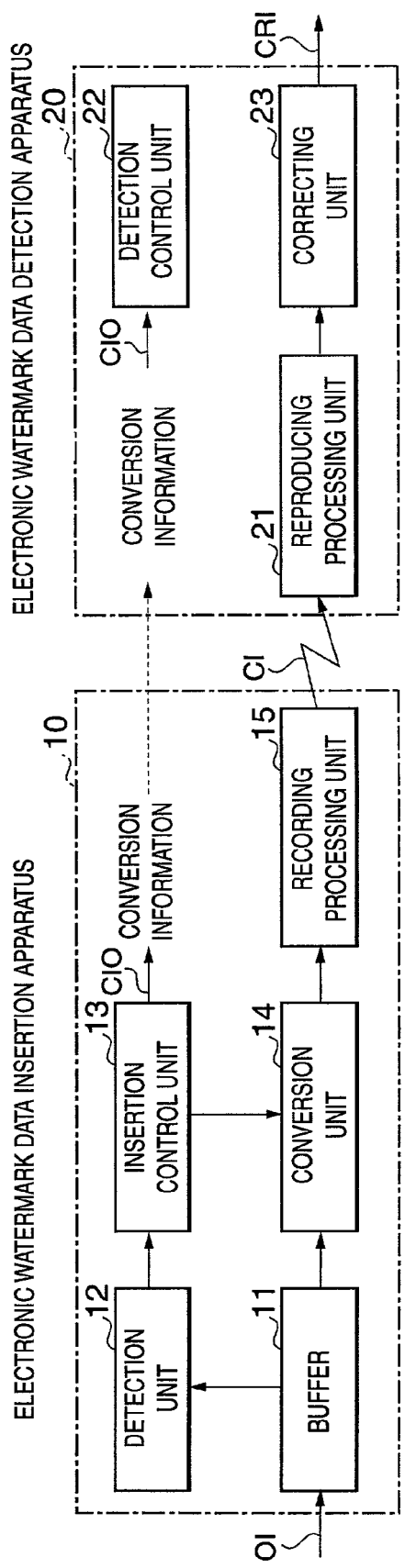
FIG. 1 is a block diagram showing a image data processing system comprising a conventional electronic watermark data insertion apparatus and a conventional electronic watermark data detection apparatus.

Referring to FIG. 1, a conventional image data processing system will be at first in order to facilitate an understanding of the present invention. The illustrated conventional image data processing system comprises a conventional electronic watermark data insertion apparatus 10 and a conventional electronic watermark data detection apparatus 20 to which the above-mentioned JP-A 6-315131 or the second prior art is applicable. The electronic watermark data insertion apparatus 10 is called an information embedding apparatus while the electronic watermark data detection apparatus 20 is called a reproducing apparatus.

The electronic watermark data insertion apparatus 10 is an apparatus for inserting a predetermined invisible electronic watermark data in an original image data OI to produce a composite image data CI where the predetermined invisible electronic watermark data is inserted in the original image data OI. The original image data OI may be called an original video signal or an original picture signal. The composite image data CI may be called a composite video signal or a composite picture signal.

The electronic watermark data detection apparatus 20 is an apparatus for reproducing the composite image data CI. The composite image data CP is recorded in a recording medium (not shown) such as a magnetic tape or the like. On reproduction of the composite image data recorded in the recording medium, the electronic watermark data detection apparatus 20 detects the predetermined invisible electronic watermark data inserted in the composite image data.

The electronic watermark data insertion apparatus 10 comprises a buffer 11, a detection unit 12 connected to the buffer 11, an insertion control unit 13 connected to the detection unit 12, a conversion unit 14 connected to the buffer 11 and the insertion control unit 13, and a recording processing unit 15 connected to the conversion unit 14.

Supplied to the electronic watermark data insertion apparatus 10, the original image data OI is buffered in the buffer 11 as a buffered image data. The detection unit 12 detects correlation between successive frames from the buffered image data to produce a detected signal which is supplied to the insertion control unit 13. For instance, the detection unit 12 detects a second frame in the same static image where the same frames continue to produce the detected signal as a detected frame. The insertion control unit 13 determines a level conversion target region or regions in the detected frame to supply the conversion unit 14 with an embedding instruction signal indicative of the level conversion target region or regions. Responsive to the embedding instruction signal, the conversion unit 14 carries out a level conversion on the buffered image data to embed the electronic watermark data in the buffered image data. The insertion control unit 13 produces conversion information CIO indicative of a region or regions in the detected frame on which the level conversion is carried out. The conversion unit 14 produces the composite image data CI where the electronic watermark data is embedded in the original image data OI. The composite image data CI is supplied to the recording processing unit 15. The recording processing unit 15 records the composite image data CI in the recording medium such as the magnetic tape.

The electronic watermark data detection apparatus 20 comprises a reproducing processing unit 21, a detection control unit 22 connected to the reproducing processing unit 21, and a correcting unit 23 connected to the reprocessing unit 21 and to the detection control unit 22.

Supplied with the composite image data CI recorded in the recording medium, the reproducing processing unit 21 reproduces the composite image data as a reproduced image data. The reproduced image data is supplied to the correcting unit 23. On decoding of the composite image data, the reproducing processing unit 21 detects a signal missing part in the reproduced image data to produce a missing detected signal indicative of the signal missing part. The missing detected signal is supplied to the detection control unit 22. The detection control unit 22 is also supplied with the conversion information CIO picked up by a legal channel which is different from an obtaining channel of the magnetic tape. The detection control unit 22 controls the correcting unit 23 so as to make the correcting unit 23 an inter-frame correction between an region indicated by the conversion information CIO and the signal missing part indicated by the missing detected signal. As a result, the correcting unit 23 produces a corrected image data CRI.

By inserting the electronic watermark data in the manner which is described above, the second prior art or JP-A 6-315131 easily detects the electronic watermark data at a reproduction side in comparison with a case of inserting the electronic watermark data in LSB.

However, inasmuch as the electronic watermark data is not embedded in all of frames in the second prior art, it is impossible for the second prior art to prevent illegal copy on frames in which the electronic watermark data are not embedded, as mentioned in the preamble of the instant specification. In addition, inasmuch as the second prior art premises that the successive frames are static images or there are no change in the successive frames, it is impossible to identify the particular area in which the electronic watermark data should be embedded in a case where correlation becomes low between successive frames of a dynamic image having furious motion. Accordingly, the second prior art is disadvantageous in that there is a case where it is impossible to embed the electronic watermark data in the original image, as also mentioned in the preamble of the instant specification.

Figure 2:
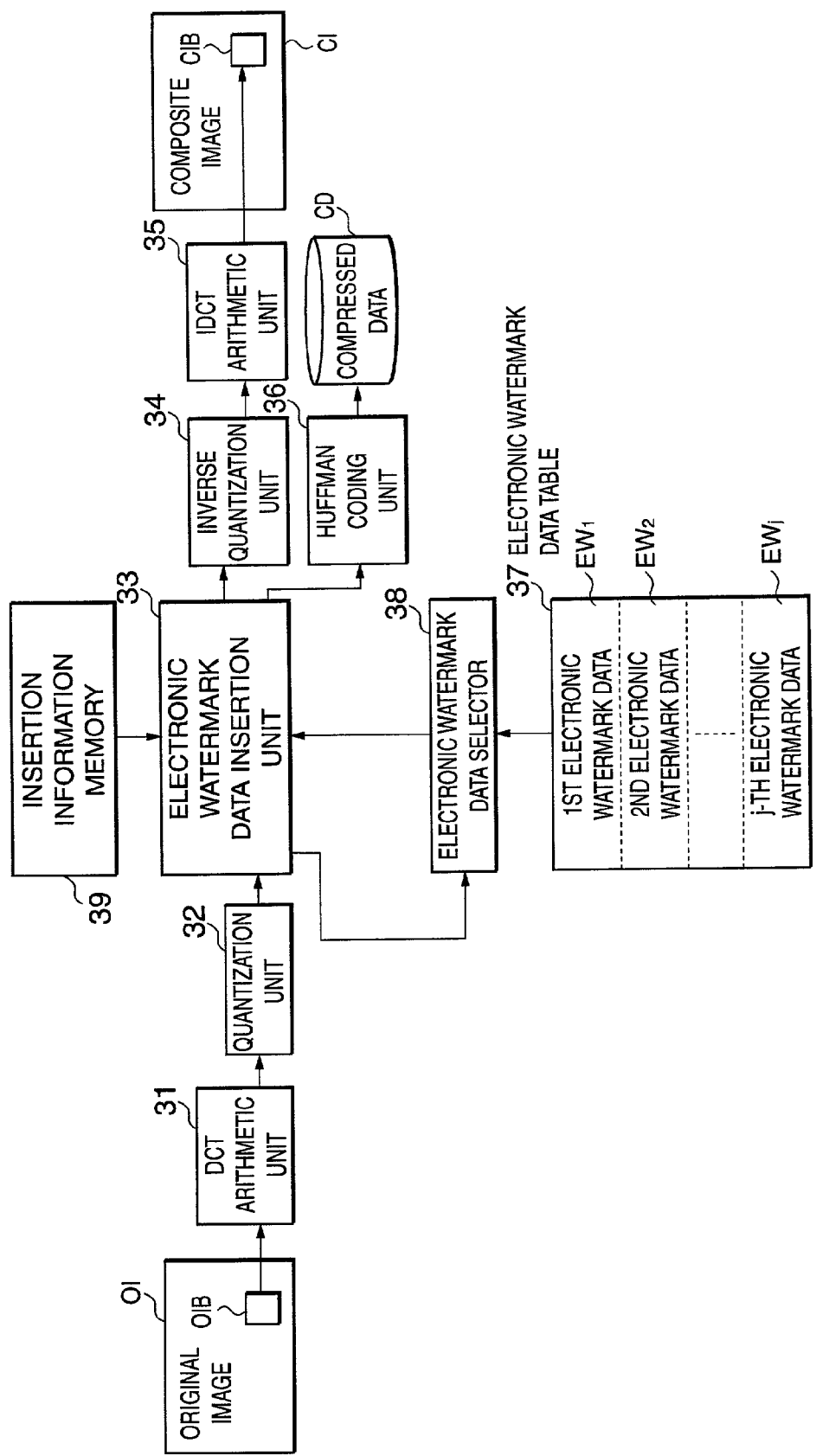
FIG. 2 is a block diagram showing an electronic watermark data insertion apparatus according to an embodiment of this invention.

Referring to FIG. 2, the description will proceed to an electronic watermark data insertion apparatus according to an embodiment of this invention.

The illustrated electronic watermark data insertion apparatus comprises a DCT (Discrete Cosine Transform) arithmetic unit 31, a quantization unit 32 connected to the DCT arithmetic unit 31, an electronic watermark data insertion unit 33 connected to the quantization unit 32.

The DCT arithmetic unit 31 is supplied with an original image OI. The original image OI is divided into a plurality of original image data blocks OIBs or pixel blocks each of which consists of (k×k) picture elements or pixels where k represents a natural number which is not less than two. The DCT arithmetic unit 31 carries out DCT arithmetic operation on each original image data block OIB to produce DCT coefficients for each component of a frequency region. At any rate, the DCT arithmetic unit 31 acts as a frequency region converting arrangement for converting the original image OI into a frequency-converted image data of a frequency region block by block. The DCT coefficients are supplied to the quantization unit 32. The quantization unit 32 quantizes the DCT coefficients into quantized DCT coefficients which are supplied to the electronic watermark data insertion unit 33. At any rate, a combination of the DCT arithmetic unit 31 and the quantization unit 32 also is operable as a frequency region converting arrangement for converting the original image OI into a frequency-converted image data of a frequency region block by block. In the manner which will later become clear, the electronic watermark data insertion unit 33 inserts electronic watermark data in each quantized DCT coefficient to produce electronic watermark inserted frequency components.

In order to display an composite image CI in which the electronic watermark data are inserted, the electronic watermark data insertion apparatus further comprises an inverse quantization unit 34 connected to the electronic watermark data insertion unit 33 and an IDCT (inverse DCT) arithmetic unit 35 connected to the inverse quantization unit 34.

Supplied with the electronic watermark inserted frequency components from the electronic watermark data insertion unit 33, the inverse quantization unit 34 inverse-quantizes the electronic watermark inserted frequency components into inverse-quantized frequency components which are supplied to the IDCT arithmetic unit 35. The IDCT arithmetic unit 35 carries out IDCT arithmetic operation on each inverse-quantized frequency component to produce a composite image data block CIB in a composite image CI. The composite image data block CIB consists of (k×k) pixels in a position which correspond to the original image data block OIB in the original image OI.

In order to preserve or hold image data in which the electronic watermark data are inserted, the electronic watermark data insertion apparatus further comprises a Huffman coding unit 36 connected to the electronic watermark data insertion unit 33. The Huffman coding unit 36 encodes the electronic watermark inserted frequency components to produce a Huffman coded composite image as a compressed data CD.

The electronic watermark data insertion apparatus further comprises an electronic watermark data table 37, an electronic watermark data selector 38 connected to the electronic watermark data table 37 and to the electronic watermark data insertion unit 33, and an insertion information memory 39 connected to the electronic watermark data insertion unit 33.

The electronic watermark data table 37 preliminarily memorizes or stores first through j-th of electronic watermark data EW1, EW2, . . . , and EWj where j represents a natural number which is not less than two. The insertion information memory 39 memorizes or stores insertion information for designating a particular electronic watermark data to be inserted corresponding to each pixel block among the first through the j-th electronic watermark data EW1 to EWj stored in the electronic watermark data table 37. The insertion information is supplied to the electronic watermark data insertion unit 33. Wire reference to the insertion information, the electronic watermark data insertion unit 33 supplies a selection signal to the electronic watermark data selector 38. Responsive to the selection signal, the electronic watermark data selector 38 selects the particular electronic watermark data designated by the insertion information for each of the pixel blocks from the electronic watermark data table 37 to produce the particular electronic watermark data as a selected electronic watermark data. The selected electronic watermark data is supplied to the electronic watermark data insertion unit 33. The electronic watermark data insertion unit 33 inserts the selected electronic watermark data in the quantized DCT coefficients to produce the electronic watermark inserted frequency components.

The DCT arithmetic unit 31 carries out DCT arithmetic operation as orthogonal transformation on the original image data block OIB to obtain the DCT coefficients which are converted as coefficients of a cosine function for each frequency component. It is well known in the art that a natural image has frequency components near to each pixel.

The coefficients obtained by DCT concentrate at a coefficient peripheral portion having a particular frequency component such as a DC component.

The quantization unit 32 quantizes the DCT coefficients obtained by such a manner. Accordingly, only the concentrated coefficient peripheral portion remains as the quantized DCT coefficients.

The electronic watermark data insertion unit 33 inserts the selected electronic watermark data in the quantized DCT coefficients. Stored in the insertion information memory 39, the insertion information II is preliminarily set for the electronic watermark data insertion unit 33 so as to correspond to each divided area where the original image OI is divided into the plurality of pixel blocks each consisting of (k×k) pixels.

Figures 3, 4:
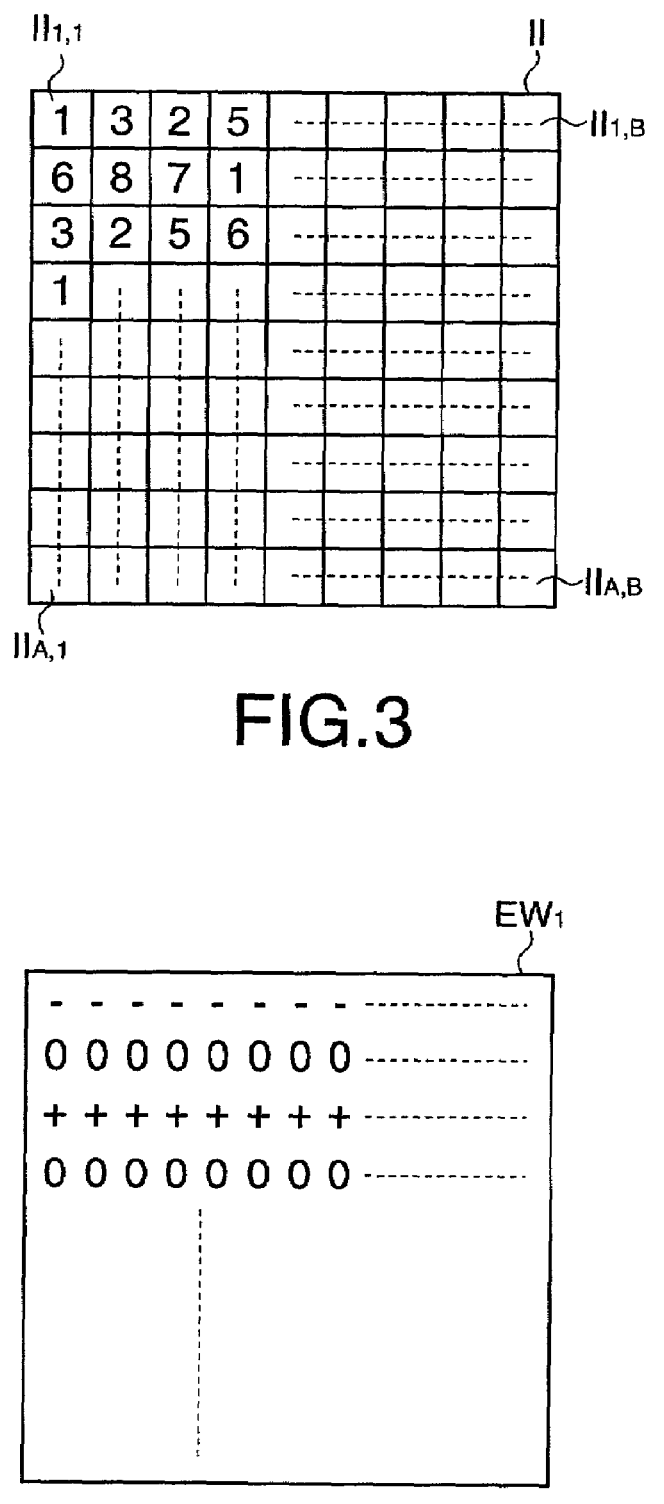

FIG. 3 shows an example of the insertion information II stored in the insertion information memory 39. The insertion information II is divided into (A×B) information blocks obtained by dividing one frame of the original image OI by each of the pixel blocks consisting of (k×k) pixels where A and B represent natural numbers which are not less than two. Each of the (A×B) information blocks is set with the number for identifying a particular one of the first through the j-th electronic watermark data EW1 to EWj stored in the electronic watermark data table 37. In the example being illustrated in FIG. 3, the (A×B) information blocks for the original image OI designate, in the order of counting from a block $II_{1,1}$ of a left-upper corner right, the first electronic watermark data EW1, the third electronic watermark data EW3, the second electronic watermark data EW2, and so on.

Turning back to FIG. 2, the electronic watermark data selector 38 determines, in response to the selection signal, a block position in the original image for the quantized DCT coefficients. Subsequently, the electronic watermark data selector 38 extracts, as an extracted electronic watermark data from the electronic watermark data table 37, an electronic watermark data designated by a specific information block of the insertion information II that corresponds to the determined block position. The electronic watermark data selector 38 supplies the extracted electronic watermark data as the selected electronic watermark data to the electronic watermark data insertion unit 33.

In general, a natural image has a high correlation between adjacent image data. Accordingly, when a common electronic watermark data is uniformly inserted in the DCT coefficients of each frame to obtain a composite image, the composite image has a high correlation between adjacent image data. As a result, image quality of the composite image is degraded caused by the inserted electronic watermark data. Thereupon, the electronic watermark data insertion apparatus according to this invention avoids degradation of the image quality by inserting electronic watermark data having a low correlation one another for each of image regions into which one frame is divided.

FIG. 4 shows an example of the first electronic watermark data EW1 registered in the electronic watermark data table 37. The first electronic watermark data EW1 has three operators of "+", "0", and "−" for the DCT coefficients of the frequency region translated by the DCT arithmetic operation for the image data. For instance, the operator of "+" indicates to increment the corresponding DCT coefficient by one or "+1", the operator of "0" indicates no arithmetic operation, and the operator of "−" indicates to decrement the corresponding DCT coefficient by one or "−1." As a result, in comparison with a case of uniformly inserting the electronic watermark data in the respective DCT coefficients of each element block, it is possible in the electronic watermark data insertion apparatus according to this invention to avoid the degradation of the image quality by inserting the electronic watermark data having the low correlation in each of the element blocks having frequency components which are near each other.

In the manner which is described above, the electronic watermark data insertion unit 33 inserts, in the quantized DCT coefficients of each frequency component, the electronic watermark data having the low correlation in the adjacent element block and the frequency component that are preliminarily registered in the electronic watermark data table 37 corresponding to a position of each element block for each of the element blocks into which the original image is divided.

Turning back to FIG. 2 again, the description will be continued. Supplied with the electronic watermark inserted frequency components from the electronic watermark data insertion unit 33 in the manner which is described above, the inverse quantization unit 34 inverse-quantizes the electronic watermark inserted frequency components into inverse-quantized frequency components which correspond to the DCT coefficients of each frequency component translated by the DCT arithmetic unit 31. Inverse quantization in the inverse quantization unit 34 is the reverse of quantization in the quantization unit 32.

The IDCT arithmetic unit 35 carries out the IDCT arithmetic operation on each inverse-quantized frequency component to produce the composite image data block CIB consisting of (k×k) pixels in which the electronic watermark data is inserted. The IDCT arithmetic operation corresponds to the DCT arithmetic operation carried out by the DCT arithmetic unit 31.

On the other hand, supplied with the electronic watermark inserted frequency components from the electronic watermark data insertion unit 33 in the manner which is described above, the Huffman coding unit 36 statistically analyzes, in a one-dimensional train of the electronic watermark inserted frequency components, the frequency of occurrence in each data pattern. Subsequently, the Huffman coding unit 36 converts the one-dimensional train of the electronic watermark inserted frequency components into a Huffman coded sequence in which short and long code words are assigned to data having much and little frequency of occurrence, respectively. The Huffman coding unit 36 produces the Huffman coded sequence as the compressed data CD.

As described above, in the electronic watermark data insertion apparatus according to this invention, the DCT arithmetic unit 31 converts the original image data block OIB of the original image OI into the DCT coefficients of each frequency component and the quantization unit 32 quantizes the DCT coefficients into the quantized DCT coefficients. Subsequently, the electronic watermark data insertion unit 33 inserts, in the quantized DCT coefficients, the particular electronic watermark data which is preliminarily registered in the electronic watermark data table 37 and which corresponds to a position of the original image data block OIB in the original image OI. The electronic watermark data insertion unit 33 produces the electronic watermark inserted frequency components. In a case of obtaining the composite image CI, the inverse quantization unit 34 inverse-quantizes the electronic watermark inserted frequency components into the inverse-quantized frequency components and the IDCT arithmetic unit 35 carries out the IDCT arithmetic operation on the inverse-quantized frequency components to obtain the composite image data CIB. On the other hand, in a case of preserving the electronic watermark inserted frequency components as the compressed data CD, the Huffman coding unit 36 converts the electronic watermark inserted frequency components into the Huffman coded sequence.

Figure 5:
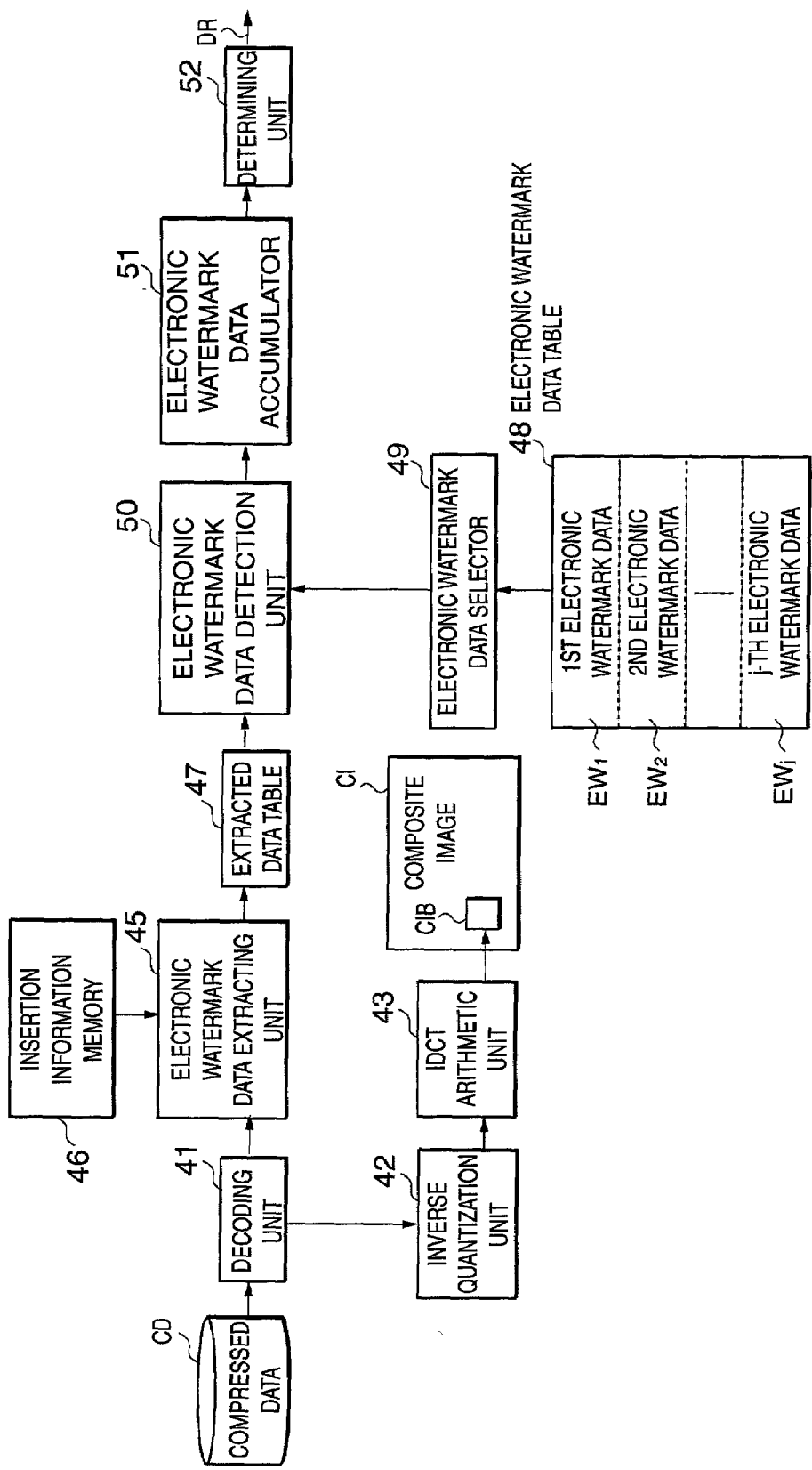
FIG. 5 is a block diagram showing an electronic watermark data detection apparatus according to an embodiment of this invention.

Referring to FIG. 5, the description will proceed to an electronic watermark data detection apparatus for detecting the electronic watermark data inserted by the electronic watermark data insertion apparatus illustrated in FIG. 2.

The illustrated electronic watermark data detection apparatus comprises a decoding unit 41, an inverse quantization unit 42 connected to the decoding unit 41, and an IDCT arithmetic unit 43 connected to the inverse quantization unit 42. The decoding unit 41 is supplied with the compressed data CD into which the electronic watermark inserted frequency components are converted by a Huffman coding in the manner which is described above. The decoding unit 41 decodes the compressed data CD into a decoded frequency region image data or decoded DCT coefficients of each frequency component. The decoded frequency region image data is substantially identical with the electronic watermark inserted frequency components produced by the electronic watermark data insertion unit 33 (FIG. 2). The decoded image data is supplied to the inverse quantization unit 42. The inverse quantization unit 42 inverse-quantizes the decoded frequency region image data into inverse-quantized frequency components which are supplied to the IDCT arithmetic unit 43. The IDCT arithmetic unit 43 carries out IDCT arithmetic operation on the inverse-quantized frequency components to obtain the composite image data CIB consisting of (k×k) pixels in the composite image CI.

Specifically, the decoding unit 41 carries out decoding operation which corresponds to the Huffman coding carried out by the Huffman coding unit 36 of the electronic watermark data insertion apparatus illustrated in FIG. 2.

The inverse quantization unit 42 is similar to the inverse quantization unit 34 of the electronic watermark data insertion apparatus illustrated in FIG. 2. Supplied with the decoded DCT coefficients of each frequency component from the decoding unit 41 in the manner which is described above, the inverse quantization unit 42 inverse-quantizes the decoded DCT coefficients into inverse-quantized frequency components which correspond to the DCT coefficients of each frequency component translated by the DCT arithmetic unit 31 (FIG. 2) of the electronic watermark data insertion apparatus. Inverse quantization in the inverse quantization unit 42 is the reverse of quantization in the quantization unit 32 (FIG. 2) of the electronic watermark data insertion apparatus.

The IDCT arithmetic unit 43 is similar to the IDCT arithmetic unit 35 of the electronic watermark data insertion apparatus illustrated in FIG. 2. The IDCT arithmetic unit 43 carries out the IDCT arithmetic operation on the inverse-quantized frequency components to produce the composite image data block CIB consisting of (k×k) pixels in which the electronic watermark data is inserted. The IDCT arithmetic operation corresponds to the DCT arithmetic operation carried out by the DCT arithmetic unit 31 (FIG. 2) of the electronic watermark data insertion apparatus.

The illustrated electronic watermark data detection apparatus not only can display the composite image CI in which the electronic watermark data are inserted in the manner which is described above but also can detect the inserted electronic watermark data itself.

For this purpose, the electronic watermark data detection apparatus comprises an electronic watermark data extracting unit 45 connected to the decoding unit 41, an insertion information memory 46 connected to the electronic watermark data extracting unit 45, an extracted data table 47 connected to the electronic watermark data extracting unit 45, an electronic watermark data table 48, an electronic watermark data selector 49 connected to the electronic watermark data table 48, an electronic watermark data detection unit 50 connected to the electronic watermark data selector 49 and to the extracted data table 47, an electronic watermark data accumulator 51 connected to the electronic watermark data detection unit 50, and a determining unit 52 connected to the electronic watermark data accumulator 51.

The insertion information memory 46 memorizes or stores insertion information which is identical with that stored in the insertion information memory 39 and which is illustrated in FIG. 3. The electronic watermark data extracting unit 45 is supplied with the decoded frequency region image data from the decoding unit 41. The electronic watermark data extracting unit 45 is also supplied with the insertion information from the insertion information memory 46. On the basis of the insertion information, the electronic watermark data extracting unit 45 extracts the watermark data from the decoded frequency region image data to produce extracted watermark data in the manner which will later become clear. The extracted watermark data are supplied to the extracted data table 47. The extracted data table 47 memorizes or stores the extracted watermark data at predetermined positions thereof.

The electronic watermark data table 48 memorizes or stores the same contents stored in the electronic watermark data table 37 (FIG. 2) of the electronic watermark data insertion apparatus. That is, the electronic watermark data table 48 preliminarily memorizes or stores the first through the j-th electronic watermark data EW1 to EWj. The electronic watermark data selector 49 successively supplies the electronic watermark data detection unit 50 with the first through the j-th electronic watermark data EW1 to EWj stored in the electronic watermark data table 48. The electronic watermark data detection unit 50 detects the electronic watermark data by calculating statistical similarity between the extracted electronic watermark data stored in the extracted data table 47 and the electronic watermark supplied from the electronic watermark data selector 49. The electronic watermark data accumulator 51 accumulates the statistical similarity calculated by the electronic watermark data detection unit 50 for a predetermined time interval to produce an accumulated addition value which is supplied to the determining unit 52. The determining unit 52 compares the accumulated addition value with a predetermined threshold value to produce its comparison result as an electronic watermark data detection determined result DR.

As described above, the insertion information memory 46 stores the contents identical with the insertion information illustrated in FIG. 3. That is, the insertion information memory 46 preliminarily memorizes the insertion information for designating a type of the electronic watermark data to be inserted block by block in one frame divided into a plurality of blocks. On the basis of the insertion information, the electronic watermark data extracting unit 45 extracts the electronic watermark data from the decoded frequency region image data. More specifically, as regards the (A×B) information blocks obtained by dividing one frame by each pixel block consisting of (k×k) pixels, the electronic watermark data extracting unit 45 adds, with reference to the insertion information, the information blocks in which the same electronic watermark data is inserted. As illustrated in FIG. 4, each electronic watermark data has the operators of one increment of "+1" or one decrement of "−1", for only the DCT coefficients having predetermined frequency components. As a result, by adding, in one frame, the image data having the frequency regions in the element blocks in which the same electronic watermark date is inserted, it is possible to obtain biased frequency components where only the DCT coefficients having a particular frequency component are projected at "+" side or "−" side. Therefore, the electronic watermark data extracting unit 45 stores such as biased frequency components as the extracted electronic watermark data in the extracted data table 47.

The electronic watermark data detection unit 50 is successively supplied from the electronic watermark data selector 49 with, as supplied electronic watermark data, the first through the j-th electronic watermark data EW1 to EWj which are preliminarily stored in the electronic watermark data table 48. The electronic watermark data detection unit 50 calculates the statistical similarity between the supplied electronic watermark data and the extracted electronic watermark data.

The electronic watermark data accumulator 51 accumulates the statistical similarity calculated by the electronic watermark data date detection unit 50 for the predetermined time interval as one unit.

The determining unit 52 is set with the predetermined threshold value. The determining unit 52 compares the predetermined threshold value with the accumulated addition value supplied from the electronic watermark data accumulator 51. When the accumulated addition value exceeds the predetermined threshold value, the determining unit 52 determines that the electronic watermark data is detected.

The accumulated addition value is reset when the above-mentioned predetermined time interval elapses or when the accumulated addition value exceeds the predetermined threshold value.

Figure 6:
FIG. 6 is a view for use in describing detection principle of the electronic watermark data in prior art.

FIG. 6 schematically illustrates a detection principle for the electronic watermark data in the above-mentioned prior art which is disclosed in, for example, the above-mentioned JP-A 11-55639. That is, the prior art comprises an electronic watermark data detection unit 60 for producing a detected value N as a detected result. The prior art determines propriety of detection in the electronic watermark data by comparing the detected value N with a predetermined threshold value. Accordingly, when the electronic watermark data having a weak strength is inserted so that image quality is not degraded, the prior art may not detect the electronic watermark data. On the other hand, when the electronic watermark data has a strong strength so as to improve detection precision of the electronic watermark data, the image quality is degraded.

Accordingly, this invention carries out accumulation and carries out detection using the accumulated addition value in order to improve the detection precision of the electronic watermark data although the electronic watermark data having the weak strength is inserted.

Figure 7:
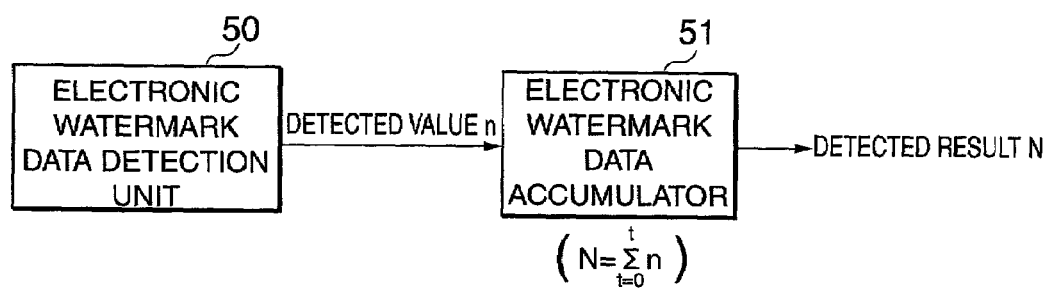
FIG. 7 is a view for use in describing detection principle of the electronic watermark data according to this invention.

FIG. 7 schematically illustrates a detection principle for the electronic watermark data in this invention. In FIG. 7, similar parts in the electronic watermark data detection apparatus illustrated in FIG. 5 are depicted at the same symbols and description thereof is omitted. That is, a detected value n detected by the electronic watermark data detection unit 50 represents the statistical similarity in the element blocks in which the same electronic watermark data is inserted among the element blocks obtained by dividing one frame. The electronic watermark data accumulator 51 accumulates the statistical similarity each the predetermined time interval to produce the accumulated addition value as a detected result N. This invention determines propriety of detection in the electronic watermark data by comparing the detected value N with the predetermined threshold value. Accordingly, it is possible to improve detection precision of the electronic watermark data although the electronic watermark data having the weak strength is inserted so that the image quality is not degraded.

Now, description will be made as regards operation of the electronic watermark data insertion apparatus and of the electronic watermark data detection apparatus according to the embodiment of this invention. Hereupon, the description will proceed to the electronic watermark data insertion apparatus for inserting the electronic watermark data in the image data of a MPEG (Moving Picture Experts Group) and to the electronic watermark data insertion apparatus for detecting the electronic watermark data.

FIGS. 8A through 8F illustrate an outline of structure of image data according to an encoding system in the MGEG standard. FIG. 8A shows structure of the image data in a sequence layer. FIG. 8B shows structure of the image data in a group-of-picture (GPO) layer. FIG. 8C shows structure of the image data in a picture layer. FIG. 8D shows structure of the image data in a slice layer. FIG. 8E shows structure of the image data in a macroblock layer. FIG. 8F shows structure of the image data in a block layer. As described above, the image data encoded by the encoding system of the MPEG standard has a hierarchical structure.

Shown in FIG. 8A, the sequence layer comprises a sequence 70 of a set of a sequence header code (SHC) and a GPO following the sequence header code. The sequence 70 is composed, for example, of one dynamic image data. The SHC is inserted in a head of each GPO and includes, for example, an image size or bit rate information.

Shown in FIG. 8B, the GPO layer comprises a GPO 71 which is the GPO in the sequence layer. The GPO 71 comprises a set of pictures of one frame or one field which consists of luminance information and chrominance or color difference information. Each picture comprises a picture start code (PSC) at a start and is encoded into one of picture formats of three kinds, namely, an I picture (intra-coded picture), a P picture (predictive-coded picture), and a B picture (bidirectionally predictive-coded picture) In addition, each picture is divided into a plurality of blocks, subjected to DCT (discrete cosine transform) block by block, quantized by the use of an appropriate quantization coefficient, and encoded a Huffman code.

Figures 9, 10:
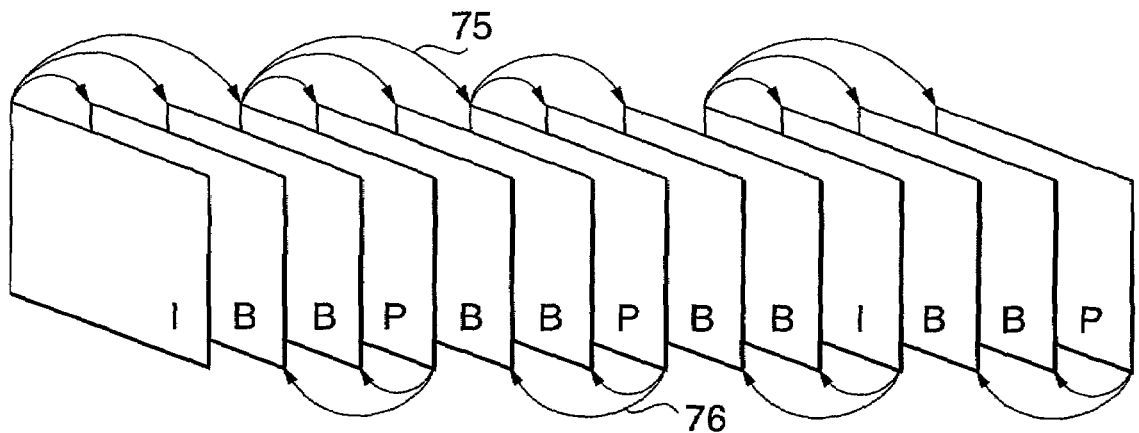
FIG. 9 shows a picture encoded by an MPEG standard.
FIG. 10 is a view for describing a method of scanning of DCT coefficients converted by DCT.

FIG. 9 schematically shows the pictures encoded by the MPEG standard. As described above, each frame is encoded into on of the picture formats of three kinds, that is, the I picture, the P picture, and the B picture. The I picture is independently encoded. For each of the P picture and the B picture, another image temporally separated therefrom is used as a reference image and only a difference from the reference image is encoded as image information. More specifically, the P picture is encoded using a temporally earlier image as the reference image due to a forward prediction 75. On the other hand, the B picture is encoded using, as the reference images, not only the temporally earlier image due to the forward prediction 75 but also a temporally later image due to a backward prediction 76. The GPO comprises the I picture as an initial picture. The I picture is used as an editing point for an image to be randomly accessed by suitably inserting the I picture in a series of dynamic image data.

Turning back to FIGS. 8A through 8F, the description will be continued. Shown in FIG. 8C, the picture layer consists of each picture 72 in the GOP layer that comprises a plurality of slices having a slice start code (SSC) at a start thereof. Each slice comprises a plurality of macroblocks (MB) each of which is a unit for motion-compensated prediction. In addition, the field information of each frame is contained in the MB 73 within the slice layer following the SSC as shown in FIG. 8D.

Shown in FIG. 8E, the MB layer is represented by six block layers in total including four block layers each indicating the luminance information Y and two block layers indicating the color difference information Cb and Cr. Each block 74 is divided into (8×8) pixels as shown in FIG. 8F and the DCT arithmetic operation is carried out block by block. That is, each block is converted or translated into the DCT coefficients of the frequency components by a two-dimensional DCT arithmetic operation. As a result, inasmuch as the obtained DCT coefficients are represented by a two-dimensional data, the two-dimensional data is converted into a one-dimensional data by scanning the two-dimensional data in the order of increasing the frequency components. In general, in a case of a natural image, the natural image has the largest DCT coefficient at a DC (direct current) component and smaller DCT coefficients when the frequency components become higher. Accordingly, there is a high probability that the DCT coefficients have values of zero by quantizing the DCT coefficients. Therefore, a scanning is carried out in the order in which an encoding efficiency becomes the highest using a Huffman code which carries out a variable-length coding in accordance with occurrence frequency of codes.

FIG. 10 illustrates a manner of the scanning for the DCT coefficients converted by the DCT arithmetic operation. It is therefore possible by using the two-dimensional DCT to obtain the DCT coefficients for the block consisting of (8×8) pixels in connection with a horizontal spatial frequency fH and a vertical spatial frequency fV. The position depicted at "1" in the figure represents a DC (direct current) component of a DCT conversion region. Rightward from this position in the horizontal direction, the DCT conversion region has a higher frequency band. Downward from this position in the vertical direction, the DCT conversion region has a higher frequency band. Therefore, scanning is started from the position "1" at an upper left corner and proceeds in a zigzag fashion in the order of "2", "3", . . . , and "64", i.e., obliquely from the low frequency band to the high frequency band in the DCT conversion region. It is therefore possible to convert sixty-four DCT coefficients into the one-dimensional series.

Referring now to FIG. 2, the description will proceed to the electronic watermark data insertion apparatus for inserting the electronic watermark data into the image data encoded according to such an MPEG standard. In the electronic watermark data insertion apparatus, the DCT arithmetic unit 31 is successively supplied with the original image data blocks OIB obtained by dividing the original image OI block by block. Each original image data block OIB consists of (8×8) pixels. The DCT arithmetic unit 31 carries out the DCT arithmetic operation or the DCT conversion on the original image data block OIB to produce the DCT coefficients of the frequency region. The DCT coefficients are supplied to the qantization unit 32. The quantization unit 32 quantizes each DCT coefficient of each frequency component by using a predetermined quantization coefficient to produce the quantized image block data.

As described above, the electronic watermark data insertion unit 33 is set with the insertion information for preliminarily designating the electronic watermark data to be inserted that corresponds to each divided area where the original image OI is divided into the original image data blocks OIB each consisting of (8×8) pixels. The electronic watermark data insertion apparatus 33 picks up, from the electronic watermark data table 37 through the electronic watermark data selector 38, the particular watermark data designated by the insertion information stored in the insertion information memory 39 that corresponds to a position of the quantized pixel block data in the original image OI. Subsequently, the electronic watermark data insertion unit 33 inserts, in the quantized pixel block data, the electronic watermark data picked-up from the electronic watermark data table 37.

Figure 11:
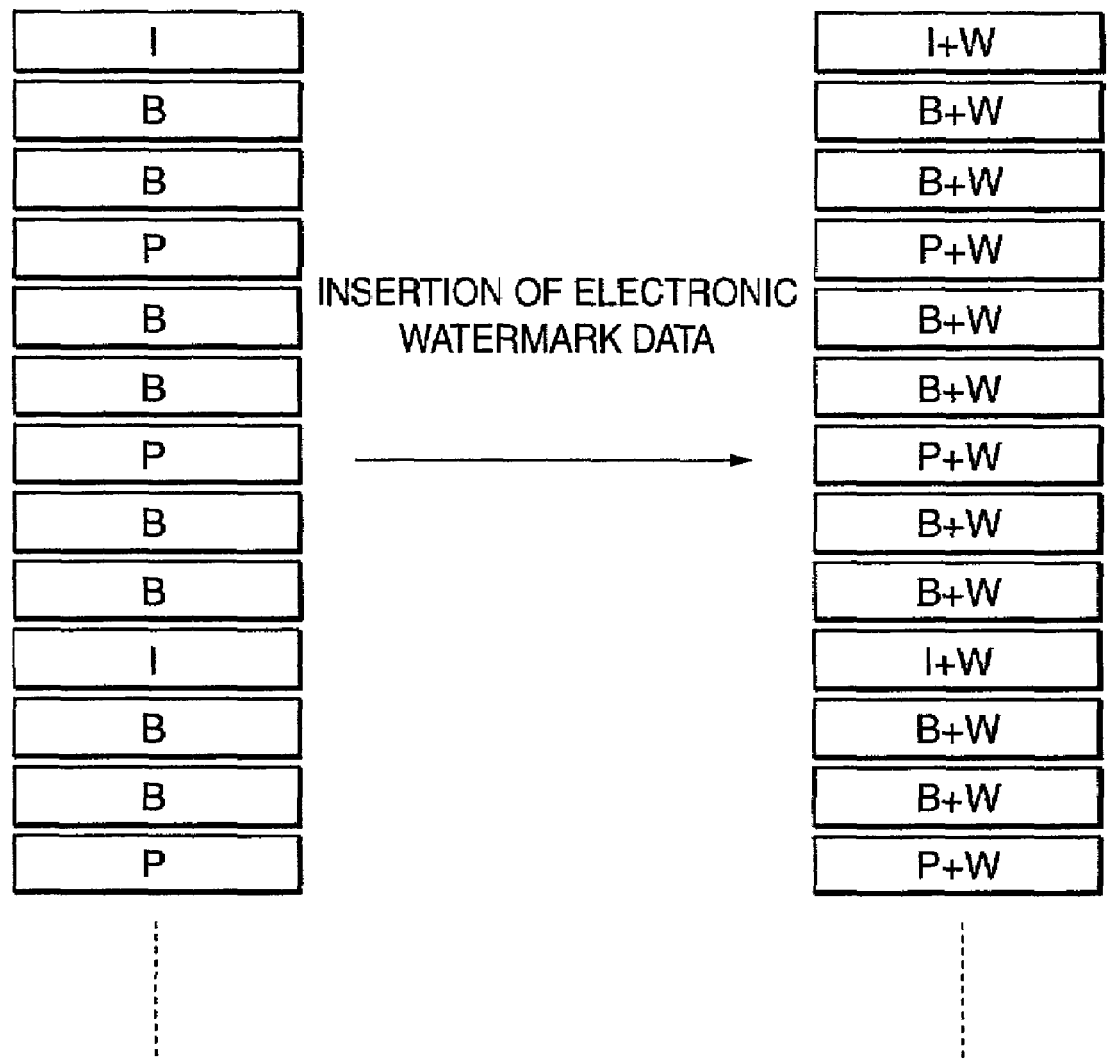
FIG. 11 is a view for describing operation of an electronic watermark data insertion unit for use in the electronic watermark data insertion apparatus illustrated in FIG. 2.

FIG. 11 schematically illustrates an outline of operation in the electronic watermark data insertion unit 33. In this manner, the electronic watermark data insertion unit 33 inserts the electronic watermark data W picture by picture. More specifically, the electronic watermark data insertion unit 33 inserts the electronic watermark data W in the DCT coefficients of the frequency region in the I picture quantized by the quantization unit 32 to convert the DCT coefficients of the I picture from I to (I+W). Likewise, the electronic watermark data insertion unit 33 inserts the electronic watermark data W in the DCT coefficients of the frequency region in the B picture quantized by the quantization unit 32 to convert the DCT coefficients of the B picture from B to (B+W). Similarly, the electronic watermark data insertion unit 33 inserts the electronic watermark data W in the DCT coefficients of the frequency region in the P picture quantized by the quantization unit 32 to convert the DCT coefficients of the P picture from P to (P+W). In the example being illustrated, a different watermark data is inserted in the block of each picture.

In order to display the composite image in the electronic watermark data in the manner which is described above again, the inverse quantization unit 34 carries out inverse quantization on each DCT coefficient of each frequency component. The inverse quantization is the reverse of the quantization carried out by the quantization unit 32. Subsequently, the IDCT arithmetic unit 35 carries out the IDCT arithmetic operation corresponding to the DCT arithmetic unit 31 to produce the composite image data block CIB consisting of (8×8) pixels in which the electronic watermark data is inserted. By carrying out such an operation on all of one frame, the predetermined electronic watermark data are inserted in the one frame block by block.

On the other hand, in a case of compressing the composite image CI to transmit or preserve the composite image CI in which the electronic watermark data are inserted in the manner which is described above, the Huffman coding unit 36 statistically analyzes the frequency of occurrence in each data pattern of the one-dimensional train of the electronic watermark inserted frequency components, converts the one-dimensional train of the electronic watermark inserted frequency components into the Huffman coded sequence in which the short and the long code words are assigned to data having much and little frequency of occurrence, respectively, and produces the Huffman coded sequence as the compressed data CD.

Referring now to FIG. 5, the description will proceed to the electronic watermark data detection apparatus for detecting the electronic watermark data inserted in the manner as described above. In a case of display the composite image CI in which the electronic watermark data are inserted as described above, the decoding unit 41 picks up, from the compressed data CD, the image data of a block consisting of (8×8) pixels and carries out decoding on the picked-up image data that corresponding to the Huffman coding carried out by the Huffman coding unit 36 (FIG. 2) of the electronic watermark data insertion apparatus. Thereafter, the inverse quantization unit 42 carries out the inverse quantization on the decoded image data that is the reverse of the quantization carried out by the quantization unit 32 (FIG. 2) of the electronic watermark data insertion apparatus. The IDCT arithmetic unit 43 carries out the IDCT arithmetic operation on the inverse-quantized image data that corresponds to the DCT arithmetic operation carried out by the DCT arithmetic unit 31 (FIG. 2) of the electronic watermark data insertion apparatus. The composite image data block CIB is stored in a storage area corresponding to a display area of the composite image CI. The storage area is a position corresponding to a display area of the original image data block OIB in the original image OI. Such an operation is carried out for all of one frame.

On the other hand, in a case of detecting the inserted electronic watermark data, the electronic watermark data extracting unit 45 extracts the electronic watermark data from the decoded data decoded by the decoding unit 41. More specifically, the insertion information memory 46 memorizes or stores the same contents of the insertion information illustrated in FIG. 3. On the basis of the insertion information, the electronic watermark data extracting unit 45 adds, in all of the pixel blocks of one frame, the DCT coefficients of the frequency region of the pixel blocks in which the same electronic watermark data are inserted.

Thereby, in the frequency region of the pixel blocks in which the same electronic watermark data are inserted within the one frame, only a particular DCT coefficient has a biased value so as to project "+" side or "−" side. When each DCT coefficient exceeds a predetermined threshold value, the electronic watermark data extracting unit 45 determines the "+" side or the "−" side and stores the determined data as extracted data in the extracted data table 47.

When the extracted data for all of the pixel blocks in one frame are stored in the extracted data table 47, the electronic watermark data detection unit 50 calculates the statistical similarity. Specifically, the electronic watermark data detection unit 50 is successively supplied through the electronic watermark data selector 49 with the first through the j-th electronic watermark data EW1 to EWj which are preliminarily stored in the electronic watermark data table 48. The electronic watermark data detection unit 50 calculates the statistical similarity between each supplied electronic watermark data and the extracted data stored in the extracted data table 47.

The statistical similarity is, for example, calculated as follows. The statistical similarity is calculated for first through n-th DCT coefficients in the order from the low frequency components among the DCT coefficients obtained from each block consisting of (8×8) pixels, where n represents a positive integer which is not less than two. More specifically, it will be assumed that first through n-th electronic watermark data candidates ww(1), ww(2), . . . , and ww(n) are known data supplied from the electronic watermark data selector 49 and first through n-th extracted electronic watermark data WW(1), WW(2), . . . , and WW(n) are stored in the extracted data table 47. Under the circumstances, the statistical similarity C between a candidate vector $\vec{ww}$ consisting of the first through the n-th electronic watermark data candidates ww(1) to ww(n) and an extracted vector $\vec{WW}$ consisting of the first through the n-th extracted electronic watermark data WW(1) to WW(n) is calculated in accordance with Equations (11) through (13) as follows:

$$\vec{WW}=(W(1), W(2), \ldots, W(n)) \qquad (11)$$

$$\vec{ww}=(w(1), w(2), \ldots, w(n)) \qquad (12)$$

$$C=\vec{WW}\times\vec{ww}/(WWD \times wwD) \qquad (13)$$

where WWD represents an absolute value of the extracted vector $\vec{WW}$ and wwD represents an absolute value of the candidate vector $\vec{ww}$. As a result, the electronic watermark data detection unit 50 supplies the electronic watermark data accumulator 51 with the statistical similarity C calculated by the Equation (13).

Supplied with the statistical similarity C from the electronic watermark data accumulator 51, the electronic watermark data accumulator 51 accumulates the statistical similarity C for a predetermined time interval to supply an accumulated addition value to the determining unit 52. Supplied with the accumulated addition value, the determining unit 52 compares the accumulated addition value with a predetermined threshold value. When the accumulated addition value is larger than the predetermined threshold value, the determining unit 52 determines that the electronic watermark data are detected. When the accumulated addition value is not larger than the predetermined threshold value, the determining unit 52 determines that the electronic watermark data are not detected. In addition, the accumulated addition value is reset when determination is made so that the accumulated addition value is larger than the predetermined threshold value or when the predetermined time interval elapses in the electronic watermark data accumulator 51.

In the manner which is described above, in the electronic watermark data insertion apparatus according to this invention, the insertion information memory 39 preliminarily memorizes or stores the insertion information for designating the electronic watermark data to be inserted in the original image OI block by block. On the basis of the insertion information, the electronic watermark data insertion unit 33 inserts, in each block of the frequency region, the designated electronic watermark data supplied through the electronic watermark data selector 38 from the electronic watermark data table 37 for preliminarily memorizing the first through the j-th electronic watermark data EW1 to EWj. In addition, in the electronic watermark data detection apparatus for detecting the electronic watermark data, the insertion information memory 46 memorizes or stores the insertion information which is identical with the insertion information stored in the insertion information memory 39. The electronic watermark data extracting unit 45 adds the image data of the frequency region block by block in which the same electronic watermark data are inserted and extracts the image data of the biased frequency region projecting in dependency on the inserted electronic watermark data. The electronic watermark data detection unit 50 calculates the statistical similarity for each electronic watermark data stored in the electronic watermark data table 48 which stores the same contents in the electronic watermark data table 37 of the electronic watermark data insertion apparatus. The electronic watermark data accumulator 51 accumulates the statistical similarity for the predetermined time interval to produce the accumulated addition result or value. The accumulated addition result is reset after the predetermined time interval elapses or when the accumulated addition result exceeds the predetermined threshold value. When the accumulated addition result exceeds the predetermined threshold value, the determining unit 52 determines that the electronic watermark data is detected.

With this structure, it is possible to provide the electronic watermark data insertion apparatus and the electronic watermark data detection apparatus which are capable of preventing image degradation with simple in structure in comparison with prior arts. This is because it is possible to insert different electronic watermark data block by block in one frame and to insert the electronic watermark data having weak strength. In addition, it is possible to define a time interval required to detect the inserted electronic watermark data By embedding signals of the electronic watermark data having a specific strength so that the electronic watermark data is detected the next time although this is not detected once, it is possible to achieve suitability of detection precision.

While this invention has thus far been described in conjunction with preferred embodiments thereof, it will now be readily possible for those skilled in the art to put this invention into various other manners. For example, this invention may be applicable to other image encoding system using the DCT such as H.261 although the description is made as regards the encoding system defined by the MPEG standard.

What is claimed is:

1. An electronic watermark detection apparatus comprising:
   insertion information memorizing means for preliminarily memorizing insertion information for designating a type of electronic watermark data to be inserted block by block in one frame divided into a plurality of blocks;
   data extracting means, supplied with an electronic watermark inserted composite image divided into a plurality of blocks in which individual electronic watermark data are inserted block by block, for extracting, on the basis of said insertion information, the electronic watermark data in said electronic watermark inserted composite image by adding the blocks in which the same electronic watermark data are inserted to produce extracted data;
   electronic watermark data memorizing means for preliminarily memorizing a plurality of electronic watermark data inserted in the respective blocks;
   electronic watermark data detecting means for calculating a statistical similarity between said extracted data and the respective electronic watermark data stored in said electronic watermark data memorizing means;
   electronic watermark data accumulating means for accumulating said statistical similarity for a predetermined time interval to produce an accumulated addition value; and
   determining means for determining whether or not said electronic watermark data is detected by comparing said accumulated addition value with a predetermined threshold value.

2. An electronic watermark detection apparatus comprising:
   insertion information memorizing means for preliminarily memorizing insertion information for designating a type of electronic watermark data to be inserted block by block in one frame divided into a plurality of blocks;
   decoding means, supplied with a Huffman coded composite image obtained by Huffman coding an electronic watermark inserted composite image divided into a plurality of blocks in which individual electronic watermark data are inserted block by block, for decoding said Huffman coded composite image block by block to produce a decoded composite image;
   data extracting means for extracting, on the basis of said insertion information, the electronic watermark data in said decoded composite image by adding the blocks in which the same electronic watermark data are inserted to produce extracted data;
   electronic watermark data memorizing means for preliminarily memorizing a plurality of electronic watermark data inserted in the respective blocks;
   electronic watermark data detecting means for calculating a statistical similarity between said extracted data and the respective electronic watermark data stored in said electronic watermark data memorizing means;
   electronic watermark data accumulating means for accumulating said statistical similarity for a predetermined time interval to produce an accumulated addition value; and
   determining means for determining whether or not said electronic watermark data is detected by comparing said accumulated addition value with a predetermined threshold value.

3. An electronic watermark detection apparatus comprising:
   an insertion information memory for preliminarily memorizing insertion information for designating a type of electric watermark data to be inserted block by block in one frame divided into a plurality of blocks;
   an electronic watermark data extracting means, supplied with an electronic watermark inserted composite image divided into a plurality of blocks in which individual electronic watermark data are inserted block by block, for extracting, on the basis of said insertion information, the electronic watermark data in said electronic watermark inserted composite image by adding the blocks in which the same electronic watermark data are inserted to produce extracted data;
   an electronic watermark data table for preliminarily memorizing a plurality of electronic watermark data inserted in the respective blocks;
   an electronic watermark data detection means for calculating a statistical similarity between said extracted data and the respective electronic watermark data stored in said electronic watermark data table;
   an electronic watermark data accumulator means for accumulating said statistical similarity for a predetermined time interval to produce an accumulated addition value; and
   a determining means for determining whether or not said electronic watermark data is detected by comparing said accumulated value with a predetermined threshold value.

4. An electronic watermark detection apparatus comprising:
   an insertion information memory for preliminarily memorizing insertion information for designating a type of electronic watermark data to be inserted block by block in one frame divided into a plurality of blocks;
   a decoding means, supplied with a Huffman coded composite image obtained by Huffman coding an electronic watermark inserted composite image divided into a plurality of blocks in which individual electronic watermark data are inserted block by block, for decoding said Huffman coded composite image block by block to produce a decoded composite image;
   an electronic watermark data extracting means for extracting, on the basis of said insertion information, the electronic watermark data in said decoded composite image by adding the blocks in which the same electronic watermark data are inserted to produce extracted data;

an electronic watermark data table for preliminarily memorizing a plurality of electronic watermark data inserted in the respective blocks;

an electronic watermark data detection means for calculating a statistical similarity between said extracted data and the respective electronic watermark data stored in said electronic watermark data table;

an electronic watermark data accumulator means for accumulating said statistical similarity for a predetermined time interval to produce an accumulated addition value; and a determining means for determining whether or not said electronic watermark data is detected by comparing said accumulated addition value with a predetermined threshold value.

* * * * *